United States Patent Office 3,095,535
Patented June 25, 1963

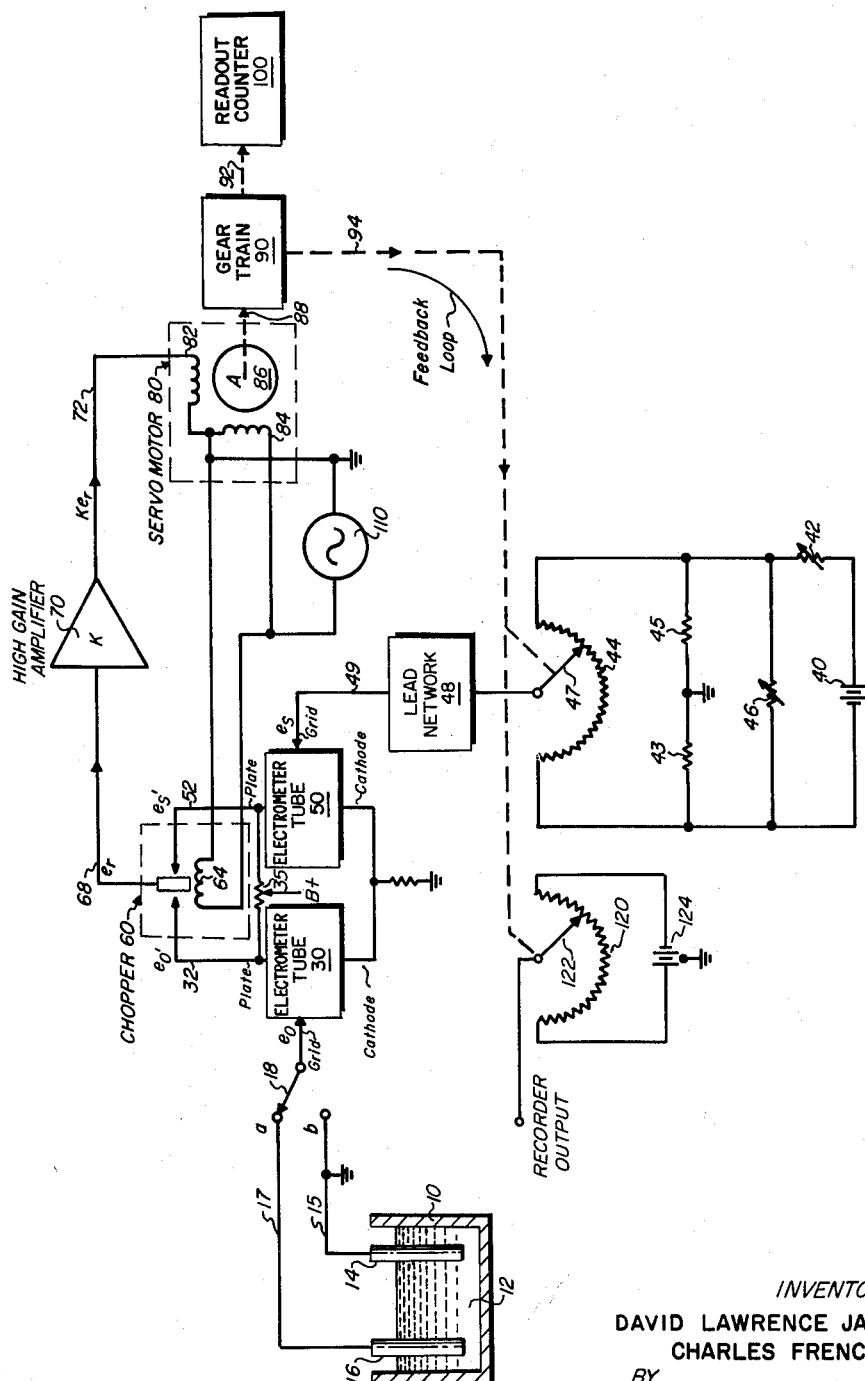

3,095,535
DIGITAL pH METER
David Lawrence Jaffe, Great Neck, and Charles French, Yonkers, N.Y., assignors to Polarad Electronics Corporation, Long Island City, N.Y., a corporation of New York
Filed Nov. 22, 1960, Ser. No. 70,978
2 Claims. (Cl. 324—30)

This invention relates to devices for measuring the activity of the hydrogen ion in solution or, as such instruments are most commonly called, pH meters, and in particular, this invention describes a novel type of direct reading pH meter wherein the read-out of the hydrogen ion activity or pH determination is presented in digital form.

Conventional instruments for measuring the pH of sample solutions generally include a pair of electrodes, glass and calomel being among the most popular, where, upon immersion in the sample solution, an electric potential proportional to the amount of hydrogen ion activity of the sample solution is generated. This electric potential, which is on the order of millivolts, may then be applied to a potentiometer circuit of the galvanometer-bridge type. The potentiometer is then adjusted, until the deflection of the galvanometer becomes zero, by the balancing-off of the electric potential generated between the immersed electrodes against a voltage derived from a standard reference cell. The setting of the various rheostats in the potentiometer instrument required to achieve the balance condition provides a measure of the electrode potential and thus of the pH of the sample solution. While rendering readings and measurements of a high degree of accuracy, the potentiometric type of pH meter generally requires a not inconsiderable amount of time and effort to bring the instrument into balance and accordingly is unsuitable for rapid pH determination of batches of various sample solutions when the highest accuracy is not needed.

The other kind of pH meter which is quite commonly employed is the "direct reading" type wherein the electric potential generated between the immersed electrodes is applied, after suitable amplification, to a millivoltmeter whose scale is calibrated directly in units of pH. Such an instrument has fewer manipulative steps than the potentiometric type of pH meter and is adaptable to continuous recording or process control of industrial operations. However, human errors frequently occur in the reading of this kind of pH meter due to mistakes resulting from interpolation or parallax. These errors in observation are especially prevalent when relatively unskilled workers are responsible for the operation of such instruments in the course of the measurement of the hydrogen ion activity of large batches of sample solutions in industrial laboratories or production areas.

The present invention provides a novel type of pH meter wherein the readout of hydrogen ion activity is of the digital type, i.e., a numerical value for the pH of the sample solution is given directly, in contradistinction to the so-called "direct reading" type requiring the interpretation by an observer of a needle deflection on a printed meter scale. Accordingly, accurate, virtually error-free, determinations of the hydrogen ion activity of many sample solutions can be made in rapid order by unskilled operators once the instrument has been calibrated in accordance with conventional techniques. Such an instrument thus should prove extremely useful in industrial control operations or in large scale research investigations. In addition, a further feature of this invention provides means for compensating the operation of the instrument for variations in ambient temperature.

It is therefore an objective of this invention to provide pH meter means for measuring and rendering a digital indication of the hydrogen ion activity of sample solutions.

It is another objective of this invention to provide pH meter means for measuring the hydrogen ion activity of sample solutions comprised of economical and readily available components and yet having a relatively high degree of accuracy and precision.

It is yet another objective of the present invention to provide a pH meter means for measuring the hydrogen ion activity of sample solutions including closed loop servo-mechanism means for minimizing the effects of aging and drift in the characteristics of components comprising the instrument.

Still another objective of this invention is to provide novel pH meter means which is especially suitable for industrial control over the hydrogen ion activity of large batches of sample solutions.

Further objectives and advantages will become apparent upon a consideration of the single drawing, which is a partially schematic and partially diagrammatic view of an embodiment of a digital pH meter in accordance with the principles of the present invention.

Container 10 holds a sample solution whose hydrogen ion activity or pH is desired to be determined. Immersed therein are an indicator electrode 16, which for example may be of the glass type, connected by a lead 17 to a switch terminal 18a, and a reference electrode 14, suitably of the calomel type, connected by a lead 15 to ground and also to switch terminal 18b. The electric potential $e_0$, which is developed between the immersed pair of electrodes 16 and 14 as a result of the hydrogen ion activity of the solution 12, is applied, when switch 18 is in the "a" position shown, to the grid of electrometer tube 30. An electrometer tube, such as Raytheon CK5886, is a special type of pentode vacuum tube which is commonly used in this connection, in which the grid circuit current drain is extremely small (on the order of $10^{-13}$ amperes or less) which is utilized to present a very high input impedance so as to thereby minimize the error in the determination of the magnitude of the electro-source due to potential drops in the electrodes. The electrometer tube, which has a gain of approximately unity, is primarily used for the isolation of buffer purposes just described rather than for amplification. This kind of electron discharge tube and its conventional circuit is well known in the art and no further description of its function or design is needed here; however, it is to be understood that other types of high input isolation devices such as, for example, vibrating capacitor elements may be employed for the purpose indicated.

A second source of variable electric potential, $e_s$, is derived from a voltage source such as standard reference cell 40 and potentiometer voltage divider 44. This second potential $e_s$, which appears at wiper arm 47 of potentiometer 44, may be varied above and below ground potential since the center of the potentiometer 44 is maintained at effectively ground potential by the grounding of the common junction between the matched resistors 43 and 45. The purposes of variable resistors 42 and 46 will be explained subsequently. The voltage appearing on wiper arm 47 of potentiometer 44 is supplied over lead 49 to the grid of an electrometer tube 50 (which is similar in design and function to electrometer tube 30) after first passing through passive lead network 48 which serves to increase the stability and frequency response of the system servo-mechanism in a manner which is well understood by those conversant with the automatic control art. This second electric potential, $e_s$, supplied from standard cell 40 and potentiometer 44, appears at the plate of electrometer tube 50 as $e_s'$. In a similar manner, the potential $e_0$, corresponding to the chemical E.M.F. generated between the electrode pair immersed in the sample solution 12, appears at the plate of its corresponding electrometer tube as $e_0'$. By suitable adjustment of plate resistors (not shown) in the two electrometer tube circuits in the course of calibration of the instrument (as more fully described subsequently), the plate currents of the two respective electrometer tubes 30 and 50 are made to be substantially equal. Thus the voltage $e_0'$, which appears at lead 32 of electrometer tube 30, and voltage $e_s'$, which appears at lead 52 of electrometer tube 50, bear the same relationship to each other as the respective input voltages $e_0$ and $e_s$.

The two voltages $e_0'$ and $e_s'$ are then compared by means of chopper 60 which alternately samples the voltages on respective leads 32 and 52 at a rate which is determined by the frequency of the energizing current derived from a source 110 of alternating potential and passing through solenoid coil 64 of chopper 60. Typically this frequency rate is 60 cycles per second. The output potential of the chopper 60, appearing on the lead 68, has an alternating voltage component $e_r$ whose magnitude corresponds to the difference between the two electric potentials $e_0'$ and $e_s'$, and whose frequency is equal to that of the A.-C. supply 110. This error signal $e_r$ then is greatly magnified by high gain amplifier 70, which typically may be a two or three-stage vacuum tube (or transistor) amplifier circuit having a large overall gain K, illustratively on the order of 60 db. It is to be appreciated that the comparator for the two electric potentials $e_0'$ and $e_s'$, which yields the error signal $e_r$ may be of a type other than that of the chopper 60; for example, a voltage comparator vacuum tube, a digital comparator means, etc., could likewise be suitably employed.

After amplification by the high gain amplifier 70, the error signal $Ke_r$ is applied over lead 72 to the control winding 82 of the two-phase servo-motor 80 which serves as the controlled means in the overall closed loop servo-mechanism comprising the pH meter instrument. The second or field winding 84 of the servo-motor 80 is energized by a source of A.-C. potential which may also be supplied from source 110 if desired. The servo-motor 80, which may suitably be Barber-Colman model AYAE 4710, has an armature 86 which will rotate so long as a non-zero error signal is applied to the control winding, that is, so long as the error signal exceeds serves to adjust the reference voltage $e_s$ to the proper magnitude and polarity to approach substantial equality with the signal voltage $e_0$ generated by the electrodes immersed in the sample solution. The same rotation of the armature 86 of the controlled means or servo-motor 80 serves also to drive the readout counter device 100 which, by being responsive to the number of rotations of the armature 86, indicates in pH units the polarity and value of the reference voltage $e_s$ required to balance out the signal voltage $e_0$ representative of the hydrogen ion activity of the sample solution 12. Thus, when equality is reached between electric potentials $e_0$ and $e_s$, or equivalently, $e_0'$ and $e_s'$, a null is created in the error signal voltage $e_r$. When this condition occurs, then the A.-C. signal applied to the control winding 82 of the servo-motor 80 becomes substantially zero, and the armature 86 thus ceases to rotate, thereby indicating this situation of substantial equality between the reference and the signal potentials. The digital display of the readout counter therefore is a direct measure of the hydrogen ion activity or pH of the sample solution 12. This counter, which may, for example, be Veeder-Root model 0–1370–44, displays a direct digital indication of the pH of the sample solution without the necessity of correcting for parallax or of interpolation as is often needed with conventional instruments of the needle-deflection kind.

The parameters for the servo motor and the gear reduction train are matters of design choice well within the purview of those skilled in the art, and therefore none are given here although such specifications are readily deducible from straightforward engineering calculations, once the characteristics of the electrode combination are known. Thus, by way of illustration, it is known that a calomel-glass electrode pair presents a fairly linear electric potential vs. hydrogen ion activity with a slope of 59.1 millivolts per pH unit at 25° C. Hence the design of the gear train and counter in conjunction with the servo motor is required to indicate one pH unit on the readout counter 100 for every 59.1 millivolts of electric potential generated between the electrodes in the sample solution at hydrogen ion activity of water; that is, the amount of the hydrogen ion is equal to the amount of hydroxyl ion present in the solution. This step is utilized to ascertain that the instrument is in proper operating order and is a relatively coarse adjustment since the readout counter 100 should indicate a value in the vicinity of 7 pH units. A precise calibration is not obtained from this reference point of ground potential since the asymmetry potential of the electrodes themselves must be compensated for in the instrument. It then is necessary to precisely calibrate the instrument for the determination of the pH of the unknown sample solution 12. Generally, an approximate value of this pH is usually known or may be readily determined in advance of measurement through the use of chemical indicators or other means known to those skilled in the art; thus, by way of example, it will be assumed that the sample solution 12 has a hydrogen ion activity in the vicinity of 8.50 pH units. Through the use of standard buffer solutions (these are reference solutions whose pH values are known to a high degree of accuracy as they are based on standards supplied by governmental laboratories), two calibration points respectively greater than and less than the value of the pH of the unknown sample solution, may now be accurately fixed. The first buffer solution, usually of pH value 7.00, determines the first point or zero-set of the pH meter and serves to compensate the pH meter for the asymmetry potential of the electrodes. The electrodes are immersed in this first buffer solution of precisely known pH and the parameters of the instrument are adjusted as required; for example by variation of the setting of the plate resistor 35 in the circuits of the electrometer tubes 30 and 50, so that the readout counter 100 accurately indicates the pH of the buffer solution. The second of the two calibration points straddling the pH of the unknown sample solution is determined by a second buffer solution, of an assumed value of 9.00 pH units for the given example, into which the electrodes are immersed in a similar manner after cleansing. The readout counter 100 is then calibrated for this second point by adjustment of variable resistor 46 which serves to set this second point substantially independent of the instrument adjustment made for the first calibration point. After this procedure the instrument now has been properly aligned to measure accurately the pH of the unknown sample solution 12 as the meter will evidence a substantially linear response between the two calibration set points. Hence, after immersion of the electrode pair into the sample solution 12, the readout counter 100 will then yield an accurate indication of the degree of hydrogen ion activity present in the sample solution.

For continuous process control or monitoring operations, a graph recorder may be connected to a second potentiometer 120 ganged to the shaft of potentiometer 44 so as to be driven by the same gear linkage 94; this second potentiometer 120 having a fixed potential 124 applied across its two fixed terminals and the recorder output being derived from the rotatable wiper arm 122 of the second potentiometer in a manner well known to those who are conversant with the art. This is, of course, an added convenience feature which may be incorporated in the invention, if desired, for the purpose of increasing its applicability.

It is believed that the foregoing specification and drawing provides a sufficient disclosure to enable anyone skilled in the art to construct an operable embodiment in accordance with the principles of the invention. Accordingly, it is desired that the scope of this invention be not limited by the specific embodiment shown and described herein but that it be restricted solely by the following appended claims.

What is claimed is:

1. In a pH meter of the class described, the combination comprising: an indicator electrode and a reference electrode for generating a first electric potential proportional to the hydrogen ion activity of a sample solution into which both said electrodes are immersed, a variable source of second electric potential, said source comprising a potentiometer connected to a stable reference voltage source having a temperature compensation resistor in series therewith and a calibration resistor in parallel with said potentiometer for calibrating the response of the apparatus by the use of standard solutions, comparator means for obtaining an error signal representative of the difference between said first electric potential and said second electric potential, said comparator means including first and second high-input-impedance buffer means respectively connected to said first and said second electric potentials and chopper means for alternately sampling the respective outputs of said first and said second buffer means at a predetermined frequency rate, means for amplifying said error signal, controlled means having a rotably positionable output responding to the magnitude and polarity of said amplified error signal, rotation-counter means driven by said output of said controlled means, translating means connected to said output of said controlled means for varying the setting of said potentiometer in a closed-loop signal-feedback manner until a null in said error signal is reached corresponding to a condition of substantial equality between said first and said second electric potentials, whereby the readout of said rotation-counter means is then indicative of the hydrogen ion activity of said sample solution.

2. Apparatus as claimed in claim 1, wherein said potentiometer is connected to ground potential through respective resistors connected from respective fixed contacts of the potentiometer winding to a ground potential point to form a bridge circuit, whereby either positive or negative electric potential is available at the movable contact of said potentiometer with respect to ground potential.

References Cited in the file of this patent

UNITED STATES PATENTS

| 2,618,674 | Stanton | Nov. 18, 1952 |
| 2,622,192 | Tarpley | Dec. 16, 1952 |
| 2,724,022 | Williams et al. | Nov. 15, 1955 |

OTHER REFERENCES

Lewin: Chemical Instrumentation, Journal of Chemical Education, vol. 36, No. 9, September 1959, pages A477–A481.